UNITED STATES PATENT OFFICE.

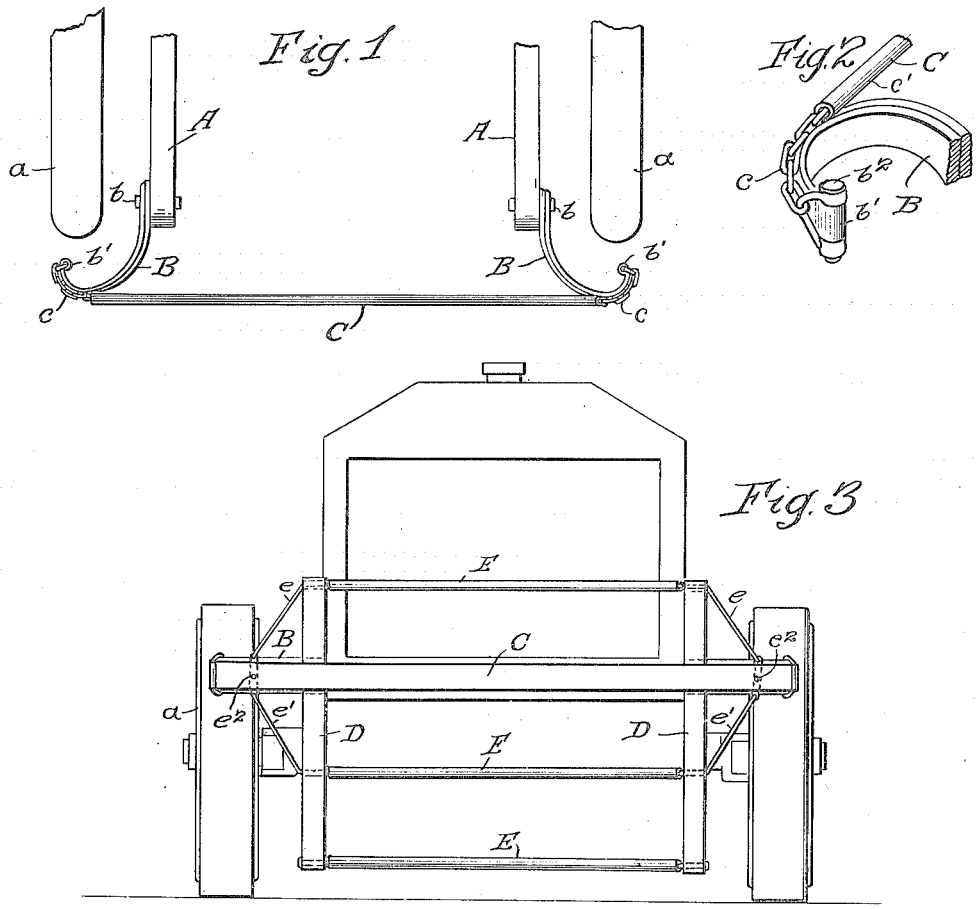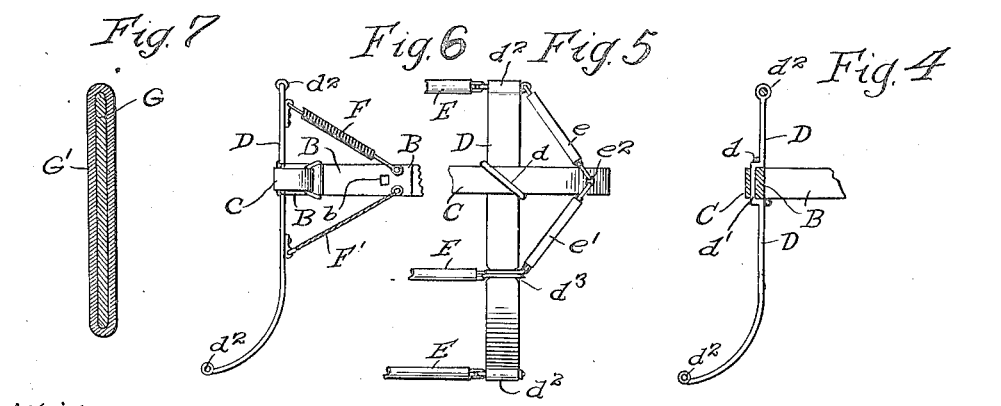

ANDREW P. OLSON, OF CHICAGO, ILLINOIS.

AUTOMOBILE BUFFER OR FENDER.

1,180,418.  Specification of Letters Patent.  Patented Apr. 25, 1916.

Application filed March 3, 1916. Serial No. 81,800.

*To all whom it may concern:*

Be it known that I, ANDREW P. OLSON, a citizen of the United States, residing at Chicago, in the county of Cook and State of Illinois, have invented certain new and useful Improvements in Automobile Buffers or Fenders, of which the following is a specification, reference being had therein to the accompanying drawing.

My invention relates to automobile buffers or fenders, and its object is to provide a simple device, which may be folded up and packed in small compass for shipment without disassembling, and which when attached to the automobile will protect its forward portion and the parts such as the radiator and lamps usually mounted on its front from injury by collision with other vehicles without the fender becoming permanently bent or distorted from the blow or shock.

In automobile buffers as now generally constructed a rigid bar or rail extends across the front of the automobile and is attached to the frame by yielding connections so that when the bar is struck a light blow as in collision with another vehicle the connections yield more or less, but in these constructions when the bar is struck a heavy blow in excess of the maximum yield of its mountings it is bent or distorted. Also, in these devices as heretofore made the buffer or fender cannot be conveniently packed for shipment without disassembling it. By my invention I obviate both of these objections and provide a buffer or fender which may be conveniently packed in a small package for shipment without disassembling its parts, and which when struck either a light or heavy blow will yield and when the strain of the blow or impact is removed will resume its original shape and position.

In the accompanying drawings Figure 1 is a top plan view of a portion of the frame of an automobile with my improved fender or buffer attached in position; Fig. 2 is a view of the inside or rear of one of the side spring arms and its attached cross-band; Fig. 3 is a front view of the same parts with a supplemental frame and parts in position thereon; Figs. 4, 5 and 6 are detail views of parts of the supplemental device, and Fig. 7 is a sectional view of a modified form of cross band.

Referring to the accompanying drawings, the reference letter A designates the frame of an automobile or vehicle, and B designates a pair of spring side arms preferably composed of a plurality of leaf springs suitably connected together in unitary form and attached at one end to the frame by suitable securing means such as the bolts $b$. The spring arms are bowed or curved so that when they are attached to the frame as shown in Fig. 1 their outer or free ends extend laterally in opposite directions beyond the sides of the frame and preferably into the line of the supporting wheels $a$. The outer or free end of each arm is provided with a loop or eye $b'$ to receive a suitable bolt $b^2$, the eye being made in sections or with a central slot which receives an end of the flexible and resilient cross-piece through which the bolt passes to connect the parts. The cross-piece C is a flexible member which will itself bend or yield to blows or strains and which is extended or held taut and restored to its original position after the strain is removed by the spring arms, and the cross-piece may be composed of any suitable elements and material having these capabilities. In the present exemplification the front cross-piece is composed of a suitable chain $c$ whose end links are attached to the eye bolts of the side arms, and which is provided with a suitable protecting covering, such as a rubber tube or envelop $c'$. The length of the cross-piece is such that when the attached arms are mounted upon the frame as shown in Fig. 1, the cross-piece is stretched taut between the outwardly projecting ends of the arms and in position to protect the lamps, radiator and forward portion of the car from injury by collision with other vehicles. When a blow or strain is placed upon the cross-piece its flexibility allows it to yield, and when the strain or impact is heavy the spring arms provide a further yield, and in either case when the strain or impact is removed the resiliency of the arms restores the parts to their original shapes and positions. By this construction I obviate the permanent distortion or bending of the front bar or rail which frequently occurs with fenders as now constructed, while at the same time my device provides the same protection for the radiator, lamps and front of the machine as do fenders having a rigid rail. Furthermore, by my construction the parts may be easily and conveniently packed in small compass or package for shipment without being disassembled, as the flexible character of the cross-piece permits the two side arms to be nested together with the flexible member wrapped around them, and when the device is unpacked the flexibility of the cross-piece enables the side arms to extend it taut so all the parts will assume their operative positions when the device is assembled in position on the automobile. The outer ends of the side arms are slightly reversely curved or bent so that when the cross-piece is stretched between them its ends will lie along in contact with the extremities of the arms so that all of the strain does not come directly upon the bolts. The side arms when detached from the cross-band C spring apart beyond the length of the band and so are put under tension when they are in normal position with the band assembled on them.

Referring to the construction shown in Figs. 3, 4, 5, and 6, which illustrate the device as built especially for motor trucks, the spring side arms B carry a supplemental frame, which is composed of an opposite pair of vertical legs D and a plurality of flexible cross-bands E. The legs D are in the form of flat springs curved forwardly at their lower ends and are connected to the arms B near their tops by clips $d$, the legs being bowed forwardly as at $d'$ at their point of crossing the arms in order to provide seats for the latter. The legs D lie between the arms B and the cross-piece or band C, and are retained in their vertical position by top and bottom lateral links $e$ and $e'$, which are continuations of two of the cross-bands E and are secured at $e^2$ to the cross-band C in any suitable manner. The upper ends of the legs D are connected to the arms B by tension springs F to allow the supplemental frame to turn on the arms B so that its lower end may yield inwardly or rearwardly under any strain placed upon it, as when it strikes an obstacle or pedestrian, and the legs D are connected near their lower ends to the arms B by suitable cables or links F' which limit their outward throw or position, so that the supplemental frame is held in substantially vertical position. The cross-bands E are preferably of the same construction and composition as the band C, and the upper and lower ends of the legs D are provided with eyes $d^2$ to receive eye bolts to which the upper and lower bands E are attached, the upper links $e$ being secured to the upper eye bolts. The intermediate band E is secured to the legs D in any suitable manner, preferably by slipping two links of its chain upon the legs, where they are fastened by seating in suitable recesses $d^3$ in the legs, with the ends of this band forming the lower links $e'$.

The flexible bands E and lateral links $e$, $e'$ permit the legs D to fold down on the arms B when the device is detached from the machine, so that all the parts may be packed in small compass for shipment, and the flexibility of the bands E permits them to yield or bend in the same manner as the band C when subjected to strain or impact and to be again extended or restored to normal position by the resiliency of the arms B when the strain is removed. The bands C and E may be of any suitable construction and material; for example, I may use a band of rubber, leather or metal, either with or without a cover G'.

I claim:—

1. In an automobile fender, a pair of oppositely outwardly curved spring arms adapted to be secured at one end to the opposite sides of an automobile, and a flexible crosspiece secured at its ends to the free ends of the arms and extended taut between said ends when the latter are in their normal positions.

2. In an automobile fender, a pair of oppositely outwardly curved spring arms adapted to be secured at one end to the opposite sides of an automobile, and having their free ends reversely bent and provided with eyes, a flexible cross-piece comprising a chain and envelop, and bolts securing the ends of the chain to the eyes of the arms whereby the cross-piece is extended taut between the ends of the arms.

3. In a device of the class described, the combination of an automobile frame, a pair of flexible and resilient arms secured to the frame and having their free ends projecting in front of and extending laterally beyond the sides of the frame, and a flexible cross-piece attached to the free ends of the arms and extended by the arms in taut position across the front of the frame.

4. In an automobile fender, a pair of oppositely outwardly curved spring arms adapted to be secured at one end to the opposite sides of an automobile, a flexible cross-band secured at its ends to the free ends of the arms and extended taut between said ends when the latter are in their normal positions, a pair of vertical legs secured to the arms, a plurality of flexible cross-bands secured to the legs, and means to retain the legs in position on the arms.

5. In a device of the class described, a pair of flexible and resilient arms adapted to be secured to opposite sides of an automobile and having their free ends projecting laterally, a flexible cross-band attached to the free ends of the arms and extended by the arms in taut position across the front of the automobile, a pair of vertical flat spring-legs secured to the arms beneath said cross-band, springs connecting the upper parts of the legs to the arms, connections between the arms and the parts of the legs extending below the arms to retain the legs in position, and flexible cross-bands connected to the legs.

In testimony whereof I affix my signature in presence of two witnesses.

ANDREW P. OLSON.

Witnesses:
    E. O. BEYER,
    C. F. CLANCY.